United States Patent [19]
Meyer

[11] 3,735,407
[45] May 22, 1973

[54] STEPPED BEAM INSTRUMENT LANDING SYSTEM

[75] Inventor: Maurice A. Meyer, Natick, Mass.

[73] Assignee: Raytheon Company, Lexington, Mass.

[22] Filed: Apr. 3, 1970

[21] Appl. No.: 25,393

[52] U.S. Cl..............................343/106 R, 343/108 M
[51] Int. Cl...............................................G01s 1/54
[58] Field of Search.......................343/108 M, 106 R

[56] References Cited

UNITED STATES PATENTS

| | | | |
|---|---|---|---|
| 3,401,389 | 9/1968 | Toman | 343/110 X |
| 2,257,320 | 9/1941 | Williams | 343/106 R |
| 3,349,399 | 10/1967 | Bohm | 343/108 M X |

Primary Examiner—Benjamin A. Borchelt
Assistant Examiner—Richard E. Berger
Attorney—David M. Warren, Milton D. Bartlett, Joseph D. Pannone and Herbert W. Arnold

[57] ABSTRACT

A signal processing system for use in an instrument landing system and operative to continuously measure aircraft position from stepped antenna patterns. Time sequential spatially stepped overlapping antenna beams are generated in the azimuth and elevation planes, and logic circuitry provided for measuring the power spectra of adjacent stepped antenna beams and for deriving precise and continuous position information therefrom.

16 Claims, 15 Drawing Figures

INVENTOR
MAURICE A. MEYER
ATTORNEYS

X = 0  PRESENCE OF SIGNAL IN GATE
X = 1  ABSENCE OF SIGNAL IN GATE

Y = 0  NO SIGNAL OR $B \geq A$
Y = 1  A B

Z = 0  NO SIGNAL OR $A \geq B$
Z = 1  $B > A$

| EVENT | | | SIGNAL IN GATE | NO SIGNAL IN GATE | A > B | B > A |
|---|---|---|---|---|---|---|
| X | Y | Z | | | | |
| 0 | 0 | 0 | ✓ | | | |
| 0 | 0 | 1 | ✓ | | | ✓ |
| 0 | 1 | 0 | ✓ | | ✓ | |
| 0 | 1 | 1 | | CANNOT OCCUR | | |
| 1 | 0 | 0 | | ✓ | | |
| 1 | 0 | 1 | | CANNOT OCCUR | | |
| 1 | 1 | 0 | | CANNOT OCCUR | | |
| 1 | 1 | 0 | | CANNOT OCCUR | | |

STEPPED BEAM INSTRUMENT LANDING SYSTEM

FIELD OF THE INVENTION

This invention relates in general to instrument landing systems and more particularly to a signal processing system for continuously determining aircraft position from time sequential spatially stepped antenna beams.

BACKGROUND OF THE INVENTION

In instrument landing systems of known design, a narrow approach cone is defined for each runway and a plurality of range marker beacons are employed to give discrete indications of range as the approaching aircraft passes over the beacons. The system and its antennas are designed for a given antenna pattern which is arranged for a particular glide path and approach lane, which are not easily varied with existing systems. For many purposes, it would be desirable to have a system capable of providing a plurality of landing approaches and also sufficiently compact to be readily moved to a remote site and easily installed. Conventional systems, by reason of their size and sensitivity to movement, cannot be moved to a remote location and set up for operation without costly and time consuming site preparation and system alignment. Moreover, conventional systems which offer a number of possible landing approaches and which provide continuous angle determination usually employ mechanically rotated directional antennas to provide continuous scanning of the intended approach sector. Such mechanically scanned systems are rather cumbersome and require constant maintenance to maintain reliable system operation.

SUMMARY OF THE INVENTION

In accordance with the present invention, a system is provided in which continuous position information is derived by novel signal processing circuitry from time sequential spatially stepped antenna beams. The stepped antenna beams can be provided by ground station apparatus utilizing electrically scanned antennas and which can be implemented in compact and easily transportable form. Signal processing according to the invention is accomplished by an airborne system operative to receive omnidirectional and directional antenna patterns transmitted from the ground station and to derive aircraft position data from the received patterns. The airborne system includes logic circuitry for comparing the power spectra of a plurality of adjacent stepped antenna beams in both the azimuth and elevation planes and for deriving a continuous indication of aircraft position therefrom.

The omnidirectional antenna pattern and the time sequential spatially stepped antenna beams are transmitted in a predetermined time sequence and the airborne system logic circuitry is operative to provide a weighted time center of received directional beams in both the azimuth and elevation planes and to determine the time difference between these weighted time centers and a time reference provided by the omnidirectional antenna pattern, which time difference is a measure of aircraft position relative to the ground station.

DESCRIPTION OF THE DRAWINGS

The invention will be more fully understood from the following detailed description, taken in conjunction with the accompanying drawings, wherein.

DETAILED DESCRIPTION OF THE INVENTION

Figure 1:
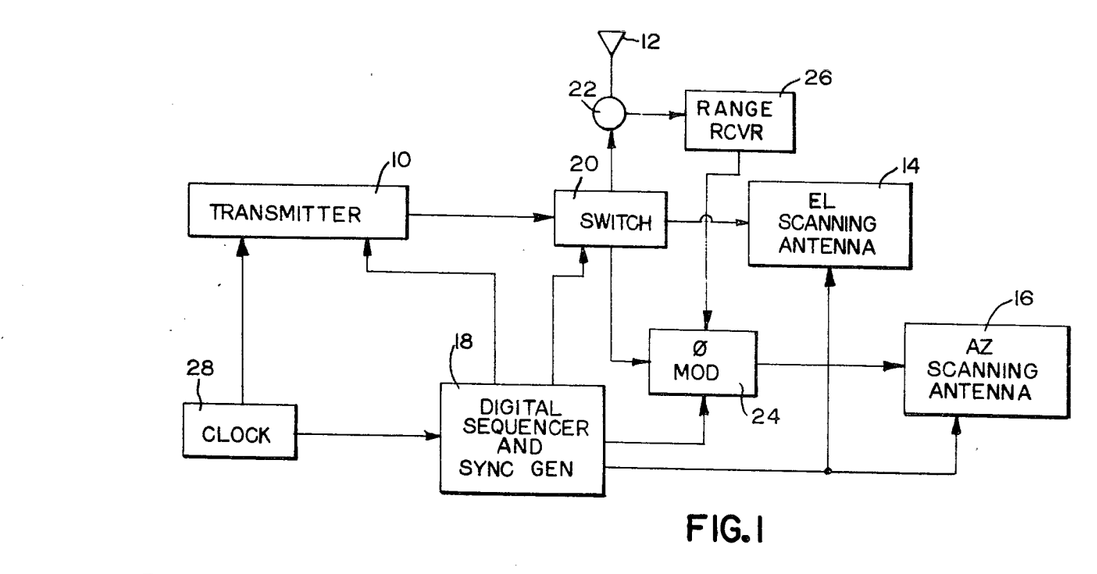
FIG. 1 is a block diagram of the ground station portion of a system according to the invention.

A system in which the invention is embodied includes a ground station which is operative to provide time sequential spatially stepped antenna beams which are in predetermined timed relation to a reference, and an airborne receiver which includes logic circuitry operative to continuously derive position information from such stepped antenna beams. The ground station is illustrated in FIG. 1 and is operative to produce an omnidirectional antenna pattern for time reference determination, a directional azimuth pattern, and a directional elevation pattern from which aircraft position can be determined. The system includes a transmitter 10 usually operative in the microwave spectrum, an omnidirectional antenna 12, an elevation scanning antenna 14, an azimuth scanning antenna 16, and a digital sequencer and sync generator 18. Transmitter 10 is connected to antenna 12 by means of a switch 20 and a circulator 22. Switch 20 also connects transmitter 10 to elevation antenna 14 and, via a phase modulator 24, to azimuth antenna 16. A range receiver 26 can be connected between circulator 22 and phase modulator 24 to provide range data at the ground station. Such range determination can be accomplished in a well known manner and forms no part of the present invention. The digital sequencer and sync generator 18, operating under the government of a precise clock 28, controls timing of the transmitted radiation sequence, from which aircraft position is determined.

The directional antennas for defining the azimuth and elevation patterns and the omnidirectional antenna for providing a time reference are usually arranged at the ground station in proximity to one another such that transmissions received by the airborne system effectively emanate from a common reference point on the ground. It will be appreciated that the sequentially stepped antenna beams define a radiation pattern relative to the reference point and aircraft position is derived from this radiation pattern also with respect to this ground reference point.

The ground station is operative to radiate narrow azimuth and elevation beams which are switched to different directions in a predetermined time sequence. The omnidirectional pattern is transmitted in timed relation to the directional beams and serves as a time and signal strength reference to enable the associated airborne receiver system to determine beam pointing direction at any particular instant. The airborne receiver, located in the aircraft being guided is operative to measure the azimuth and elevation angles that the aircraft bears from the ground station and to suitably display this information to define the course. The angular position information can also be employed to control an automatic pilot system. A desired approach lane and glide path can be manually selected aboard the aircraft to provide a reference course, and signals received from the ground station are compared with this reference, and course error between the course being flown and the selected course can be displayed on a cross pointer or other suitable indicator. The ground station can transmit in a continuous manner or can transmit selectively when interrogated by an approaching aircraft, and signals transmitted by the ground station can be coded, for example in frequency, to facilitate the decoding of the various signal components, as is well known.

The directional antenna beams are scanned in fixed increments or beam steps, each step occurring at a predetermined time with respect to a reference time defined by the transmission of the omnidirectional pattern. The omnidirectional pattern is produced by a uniquely coded pulse from transmitter 10, radiated via antenna 12, and is employed in the airborne receiver for unambiguous synchronization of the system. Each radiated directional beam has a distinguishable sync signal at the start of each beam step, thereby allowing fine sync control. By using crystal-controlled oscillators, synchronization can be readily established and maintained, and, in addition, the system is operative to maintain synchronization even though the received signals are not of sufficient magnitude for angular guidance.

Figure 2:
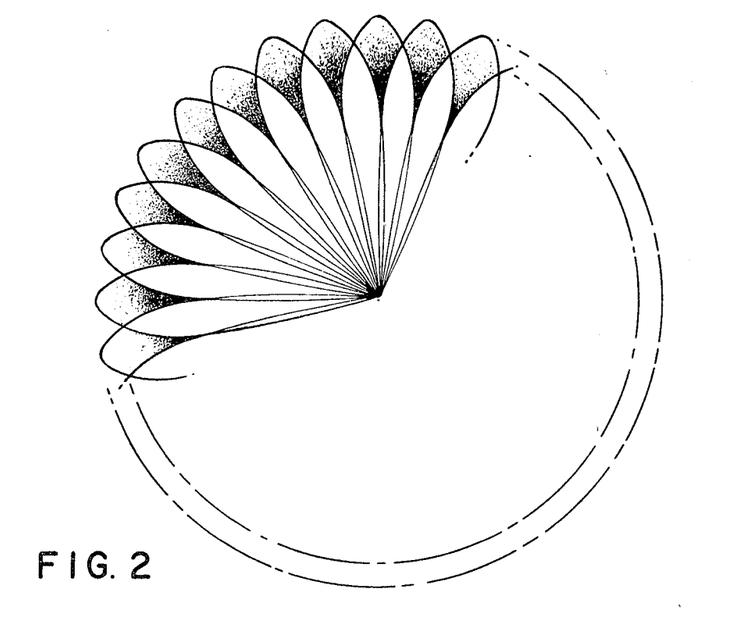
FIGS. 2 and 3 are stepped azimuth and elevation patterns, respectively, employed in the invention.
Figure 3:
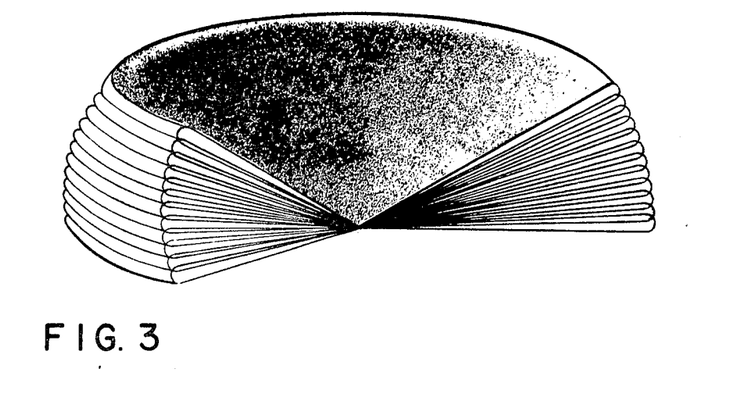

The transmitting sequence can best be described with reference to the antenna patterns of FIGS. 2 and 3 and the timing diagrams of FIGS. 4A–4D. The elevation scanning antenna 14 sequentially generates a plurality of overlapping, cone-shaped beams, as illustrated in FIG. 3, being omnidirectional in the azimuth plane and relatively narrow in the elevation plane. In the illustrated embodiment, 12 overlapping elevation beams are provided, each beam having a beamwidth of 2.5°. The azimuth antenna 16 provides a plurality of overlapping fan-shaped beams in the azimuth plane, as seen in FIG. 2. In the illustrated embodiment, 32 beams are provided, each beam having a beamwidth of 11°. In the elevation plane, the beams provide total sector coverage from 0.75° to 30°.

Figure 4A:
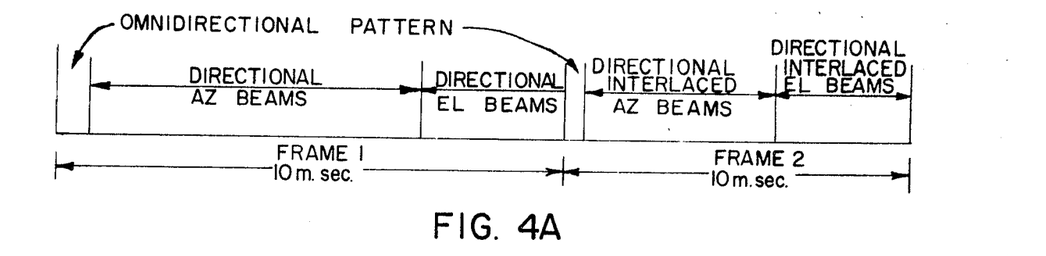
FIGS. 4A–4D are timing diagrams useful in explaining the operation of the invention.

As depicted in FIG. 4A, an omnidirectional pattern is transmitted for a predetermined duration, followed by transmission of the directional sequentially stepped azimuth beams, which, in turn, are followed by transmission of the directional sequentially stepped elevation beams. Another omnidirectional pattern is then radiated, and the sequence continues in like manner. Transmission of the omnidirectional pattern and azimuth and elevation beams occurs within a time interval which is termed herein a frame. This frame is the basic timing interval employed in the system, and in the illustrated embodiment is of 10 millisecond duration. As discussed hereinabove, and as illustrated in FIGS. 2 and 3, the stepped antenna beams for each coordinate plane are in over-lapping relationship. Even-numbered azimuth beams and even-numbered elevation beams are radiated sequentially during each even-numbered frame, while odd-numbered azimuth and elevation beams are sequentially radiated during each odd-numbered frame. As a result, an interlaced, sequentially stepped beam pattern is radiated, and it is this pattern from which aircraft guidance information is uniquely determined in a manner to be explained below.

Figure 4B:
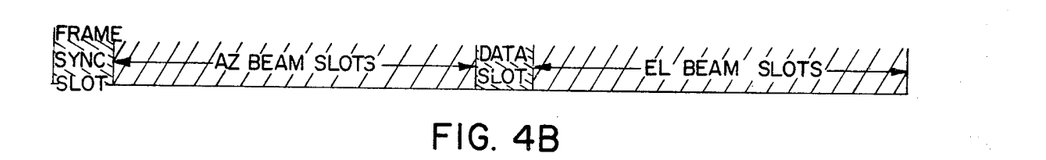
Figure 4C:
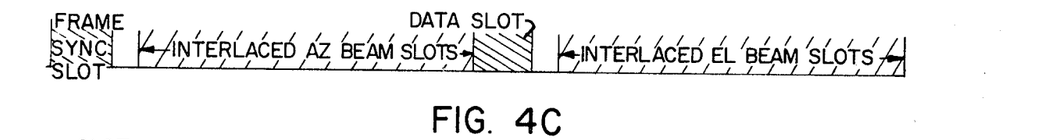

An expanded view of an odd-numbered frame, such as frame 1 of FIG. 4A, is shown in FIG. 4B. The frame is composed of a plurality of time intervals or slots for the transmission of synchronization signals and data signals, such as for station identification. In FIG. 4B, the frame sync slot is provided at the beginning of the frame for the omnidirectional pattern, while the data slot is provided between the azimuth beam slots and the elevation beam slots for transmission of such data as may be desirable in particular instances. A number of beam slots are provided within the frame sufficient to accommodate the number of azimuth and elevation beams employed in a particular system. An expanded view of an even-numbered frame, such as frame 2 of FIG. 4A, is illustrated in FIG. 4C. This even-numbered frame is similar to the format of the odd-numbered frame except that the azimuth beam slots and elevation beam slots are shifted in time by one-half the beam slot width to provide the intended interlaced beam pattern.

Figure 4D:
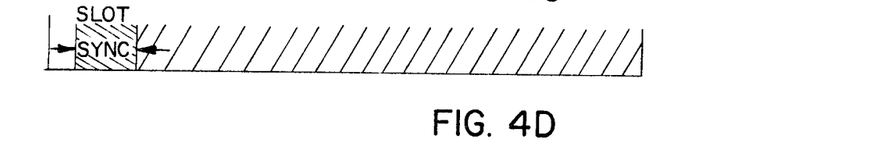

The time slots during which each azimuth and elevation beam is transmitted are depicted in FIG. 4D, and each includes a slot sync interval at the beginning of each beam slot for transmission of a slot synchronization signal. As noted in the drawing, the course determining transmissions occur at a frequency $f_o$, while the synchronization and data transmissions are at a second frequency $f_o + \Delta f$ to facilitate signal decoding. It will be noted that the directional beams in both the elevation and the azimuth planes are in interlaced overlapping relationship, and it is a particular feature of this invention that continuous angle measurements are derived from these stepped overlapping beams. Such angle measurement will be discussed in detail hereinafter in conjunction with the description of the airborne system.

The intersection of two adjacent beams in the azimuth plane forms a localizer course, or lane, and the course angle is linearly related to the difference in time between the receipt of an omnidirectional signal and the directional azimuth signal. The intersection of two adjacent beams in the elevation plane forms a glide path, the glide slope being linearly related to the difference between the receipt of an omnidirectional signal and the directional elevation signal. Thus, employing the antenna patterns of FIGS. 2 and 3, 32 lanes and 11 glide paths are available. on-course determination is provided by flying on equal amplitude signals in the respective coordinate planes. The airborne receiver is operative to compare adjacent beams and to measure the amplitude of adjacent time slot signals. The received signal is divided into four channels, one channel for each side of a chosen time position in both elevation and azimuth planes. Channel information is detected and applied to the inputs of a cross-pointer indicator. Range and range rates can also be supplied to the cross-pointer to achieve course softening and speed damping. By measuring the time at which a maximum signal occurs, the lane and path corresponding to these times can be readily determined.

Figure 4E:
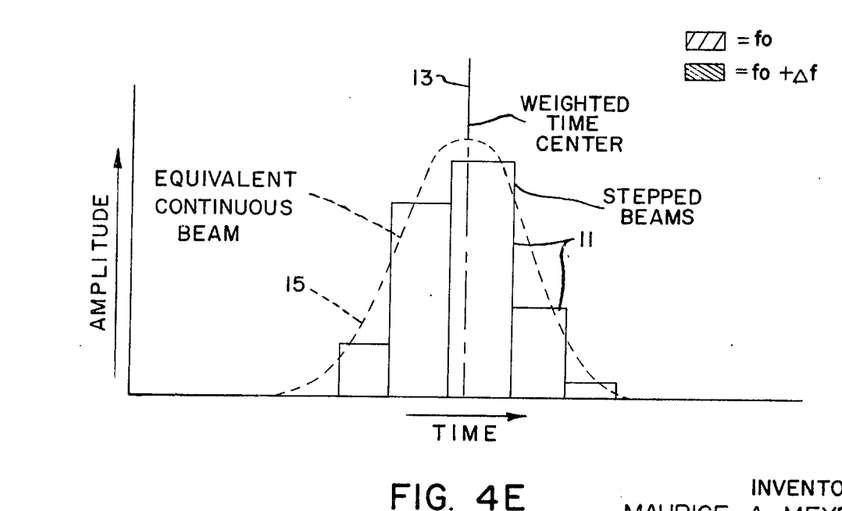
FIG. 4E is a plot of received energy useful in explaining the operation of the invention.

As discussed hereinabove, the intended antenna patterns in both the azimuth and elevation planes are comprised of incrementally stepped overlapping beams, and, according to the invention, continuous angle determination from these stepped beams is accomplished by continuous interpolation between adjacent intersections of overlapping beams. The omnidirectional pattern emitted by the ground station is detected by the airborne receiver to provide a time reference. Selected ones of the directional azimuth and elevation beams are received according to the position of the aircraft relative to the transmitting ground station, and the amplitudes of the signals received are processed to determine the weighted time center of the received directional beams. Referring to FIG. 4E, there is shown a plot of received energy from a plurality of stepped beams 11 arranged in adjacent time segments, and of relative amplitudes such that a weighted time center 13 is produced, as illustrated. This weighted time center is defined as the time at which the center line of an equivalent continuous beam 15 would illuminate the receiving antenna, were the equivalent continuous beam being scanned at a constant angular rate equal to the average rate of the actual stepped scanning beams.

It will be appreciated that the time difference or elapsed time between reception of an omnidirectional signal and the weighted time center of the directional azimuth beams is a measure of the azimuth angle of the aircraft relative to the ground station. Similarly, the time difference between reception of the omnidirectional signal and the weighted time center of the directional elevation beams is a measure of the elevation angle of the aircraft relative to the ground station.

Since the antenna patterns are radiated in a known time sequence, angular measurement is related to a time measurement such that the angular position is a function of the ratio of the time of occurrence of a particular beam and the total frame time. For example, assume an angular coverage $a$ is illuminated by N radiated beams in a frame time $T_f$, and the frame time $T_f$ is divided into a plurality of time slots $T_t$, and each stepped beam is radiated for a time $T_t$. Thus, $T_t = T_f/N$; that is, the slot time is equal to the ratio of the frame time and the number of radiated beams which illuminate the particular angular sector.

In the illustrated system, $a = 360°$ in the azimuth plane, $T_f = 7.2$ milliseconds, and $T_t = 200$ microseconds; thus, there are 36 time slots during each frame. However, angle determination is accomplished with effectively more than 36 discrete beam positions to provide greater accuracy without requiring the actual generation of additional beams. As described above, the beam patterns are interlaced in successive time frames to provide an effectively greater number of beams from which angle interpolation is achieved. In the illustrated system, two interlaced frames are employed although more than two may also be employed depending upon desired system accuracy.

Figure 5:
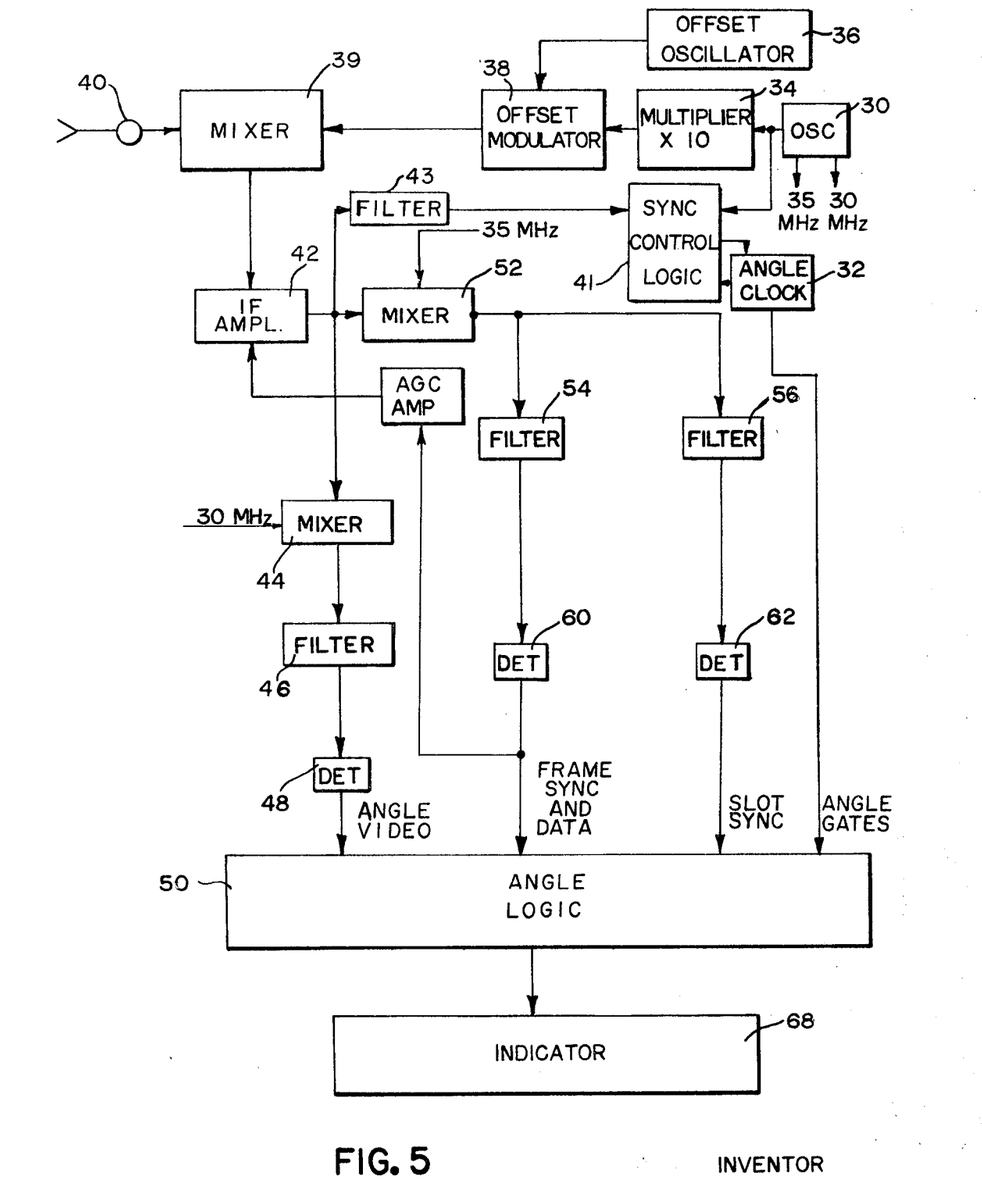
FIG. 5 is a block diagram of the airborne receiver portion of a system according to the invention.

The airborne receiver for deriving continuous angular position from the stepped overlapping antenna beams described above, is illustrated in FIG. 5. In general, a number of spatially stepped beams are received from the ground station for a direction within the area of radiation coverage. Means are provided for the azimuth and the elevation planes to measure the energy received from a particular direction and to derive a time measurement related to angular position of the aircraft relative to the ground station. This time measurement is then processed to indicate aircraft position with reference to the ground station. Referring to FIG. 5, a temperature controlled crystal oscillator 30, operating in the illustrated embodiment at a frequency of 10 MHz, serves as the basic clock source for receiver operation. The clock signal is multiplied in multiplier 36 to produce a 100 MHz signal which is then mixed in an offset modulator 38 with the signal from an offset oscillator 36, which can produce one of 10 different frequencies in the 7-9 MHz range, depending upon a particular channel manually selectable at the receiver, as will be described. The offset signal from modulator 38 is combined in mixer 39 with the directional and omnidirectional signals from the ground station received by the antenna 40 to provide an IF signal which is amplified in IF amplifier 42. The amplified IF signal is mixed in mixer 44 with a 30 MHz signal derived from oscillator 30 to provide a 5 MHz signal which is processed by filter 46 and detector 48 to provide an angle video signal which is applied to angle logic 50. Logic 50 is operative to derive an angular course measurement for display on an indicator 68.

The IF signal from amplifier 42 is also heterodyned in mixer 52 with a 35 MHz signal from oscillator 30 to derive sync and information signals from the signals received from the ground station. The output signals from mixer 52 are processed by respective filters 54 and 56, and the filter output signals are envelope detected by respective detectors 60 and 62 to provide the sync and information video signals.

The angle clock 32 operates at the same rate and is synchronized with the ground station clock. The precision of angle measurements depends upon the accuracy of synchronization, and the angle clock provides control of the receiver system to maintain frame and beam slot synchronization. The angle clock 32 can be implemented in a variety of ways and generally includes digital counters and associated logic gates for providing a digital output sequence of all possible azimuth and elevation positions within an area of coverage, as well as timing and synchronization signals to govern precise receiver operation.

Figure 6:
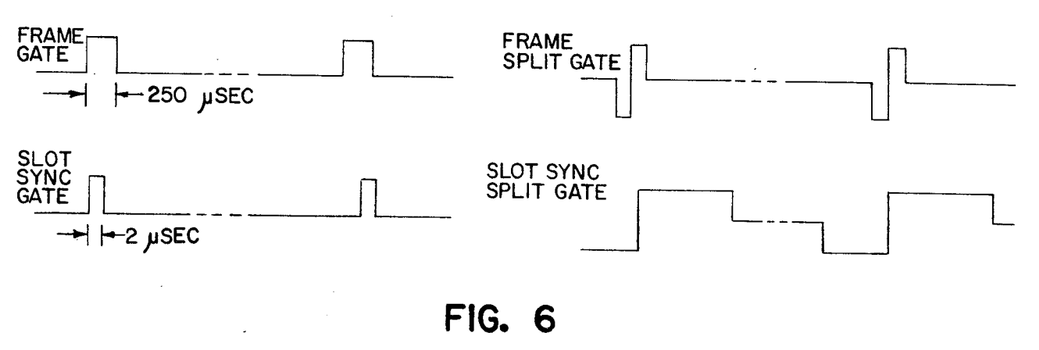
FIG. 6 is a timing diagram of the angle clock of FIG. 5.

The major timing and sync outputs of angle clock 32 are illustrated in FIG. 6. A frame gate pulse of 250 microsecond duration is generated at the beginning of each frame, and a frame sync split gate pulse is generated during each frame in coincidence with the frame sync gate pulse. A slot sync gate pulse of 2 microsecond duration is generated 9 microseconds after the beginning of each beam slot interval, while a slot sync split gate pulse is commenced within the interval of each slot sync gate pulse. Referring again to FIG. 5, sync control logic 41 is provided to selectively vary the frequency and phase of angle clock 32 in order to maintain synchronism with signals received from the ground station. To provide receiver synchronization, the received signal from IF amplifier 42 is processed in filter 42 to produce a sync signal which is applied to logic 41. The angle clock 32 provides gating signals to logic 41, and master clock signals from oscillator 30 are also applied to logic 41. Angle clock 32 is thereby controlled in frequency and phase to provide precisely timed output signals for proper receiver operation.

Figure 7:
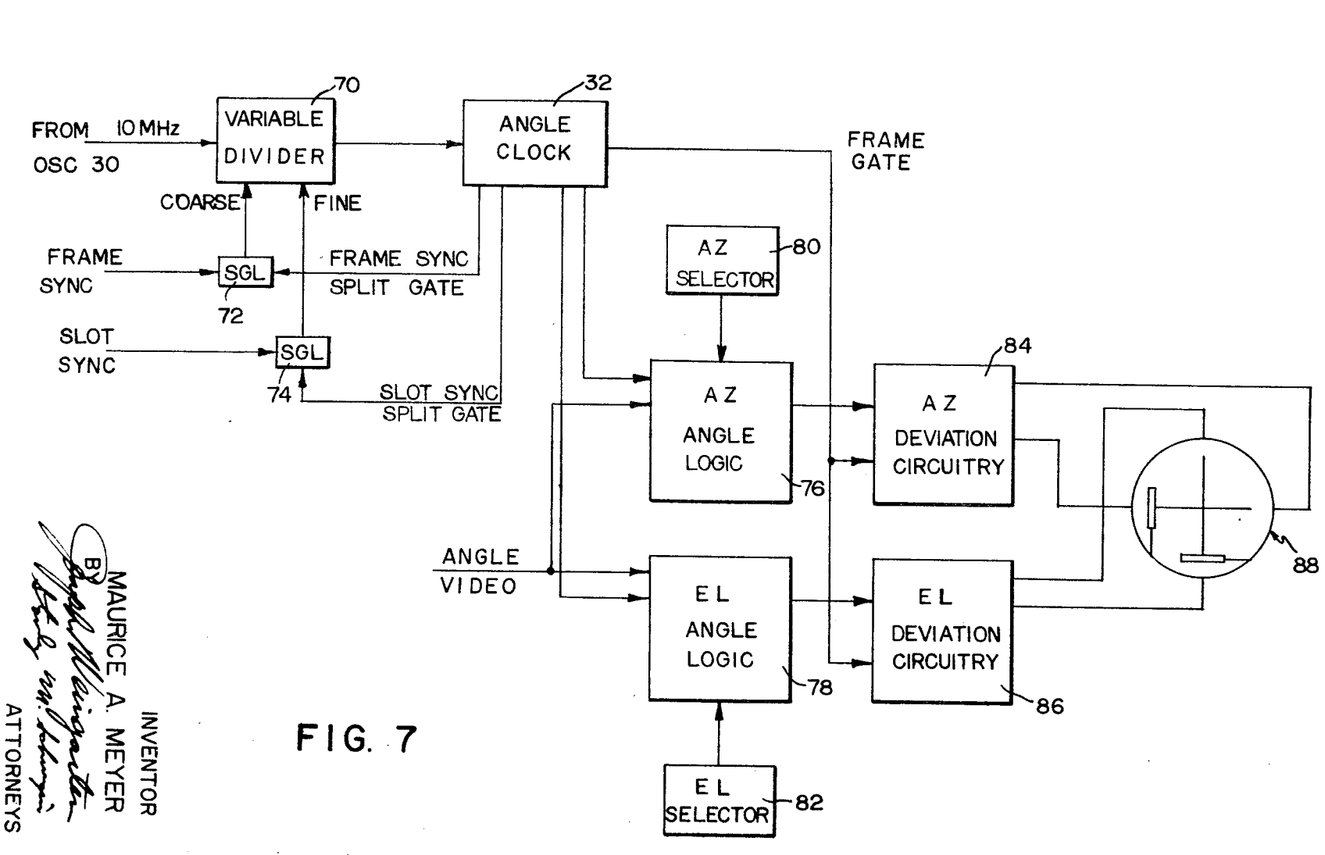
FIG. 7 is a block diagram of the receiver logic of FIG. 5.

The sync control logic 41 and angle logic 50 is illustrated more particularly in FIG. 7. Course synchronization is provided by a variable divider 70 and split gate logic (SGL) 72. A 10 MHz signal from oscillator 30 (FIG. 5) is applied to variable divider 70, the output of which is applied to angle clock 32. The frame sync signal from detector 60 is applied to logic 72, as is a frame sync split gate signal from angle clock 32. The output of split gate 72 is applied to variable divider 70. The synchronization of the timing signals is completely digital in nature and is accomplished in the following manner. A normal divider rate is chosen to provide an output indication of the intended frame interval. This interval is altered by an extremely small amount per frame by changing the division ratio for a short time during each frame. Logic 72 provides a binary output to variable divider 70, the divider being operative to divide by a factor of 5 when the logical output is at a first binary level, and to divide by a factor of 4 when the logical output is at a second binary level. By this digital technique, time frame adjustment can be made to an accuracy of 0.2 microseconds. In a similar manner, fine frequency control is accomplished by the slot sync signal from detector 62 which is applied to split gate logic 74. A slot sync split gate pulse from angle clock 32 is applied to logic 74 to provide the requisite gating. Frame synchronization to at least 10 microseconds is provided while fine frequency control to better than one microsecond per frame is provided by the present system.

Course computation itself is performed by azimuth angle logic 76 and elevation logic 78, each of which receive the angle video signals from detector 48 and gating signals from angle clock 32. An azimuth selector switch 80 and an elevation selector switch 82 are associated with respective logic circuitry 76 and 78 to provide manual selection of an intended course. Manual selection of a desired course provides a digital reference for utilization by the logic circuitry. Azimuth angle logic 76 and elevation angle logic 78 are each operative to compute the deviation of the received angle data from the preset references in the respective coordinate planes. The angle clock 32 provides a sequence of possible azimuth and elevation angles to respective logic 76 and 78 and, when the possible course from the angle clock equals the desired course, a pulse is produced while a second pulse is produced when the received angle is equal to a possible angular position sequenced from the angle clock. The time difference between the pulse produced by the desired course and the pulse produced at the intended angle is proportional to the deviation which the aircraft bears from the true course, while the order of occurrence of the pulses is indicative of the sense of the deviation from true course. The pulses from logic 76 and 78 are applied to respective deviation circuitry 84 and 86 which are operative to provide voltages proportional to the computed deviations. The output voltages from deviation circuitry 84 and 86 are applied to the inputs of a well known cross-pointer indicator 88 which visually presents a display of course deviation. Deviation circuitry 84 and 86 is gated by the frame gate pulses derived from angle clock 32.

Figure 8:
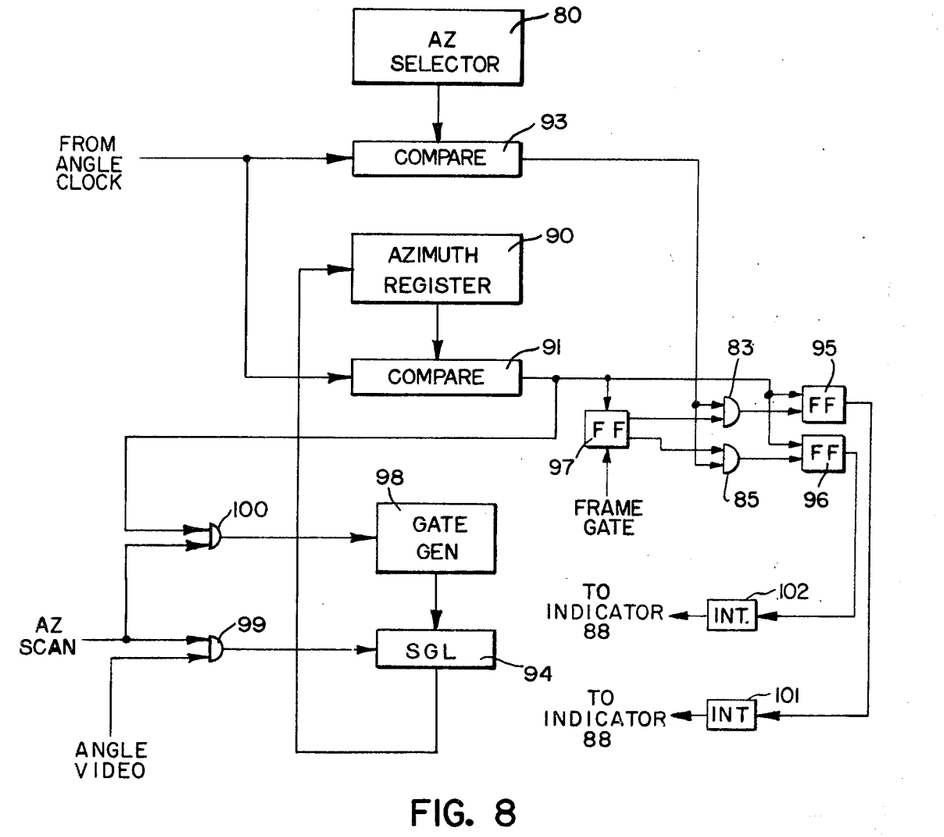
FIG. 8 is a block diagram of the angle determining logic of FIG. 7.

The logic circuitry for determining azimuth position is shown in greater detail in FIG. 8. The circuitry for determining elevation position is identical to the illustrated azimuth circuitry and need not, therefore, be separately described in detail. Broadly, the time of occurrence of a split gate pulse is adjusted such that received energy from the sum of normal and interlaced beams is equal in each half of a split gate, this time of occurrence being representative of angular position. A digital number representing a desired azimuth angle is selected by the manually controlled azimuth selector 80 and provides a reference for a comparator 93. The angle clock 32 sequences through a set of possible azimuth values and upon coincidence between the angle clock output and the selected azimuth number, an output pulse is produced by comparator 93. This output pulse is applied to one input of first and second AND gates 83 and 85. A synchronized version of the angle video signal is applied to azimuth register 90 from split gate logic 94 to set register 90 to a digital number representing the received azimuth position. When this register number corresponds to the output number of angle clock 32, a pulse is produced by comparator 91, which is applied to one input of respective flip flops 95 and 96. The output pulse from comparator 91 is also applied to flip flop 97 which receives a frame gate pulse from the angle clock. The outputs of flip flop 97 are applied to respective second inputs of AND gates 83 and 85, the outputs of which are applied to respective second inputs of flip flops 95 and 96. Angle video data from detector 48 is applied via an AND gate 99 to logic 94, the AND gate 99 being gated by an azimuth scan gate derived from the angle clock. The azimuth scan gate is also applied to an AND gate 100 which receives the output pulse of comparator 91. The output of AND gate 100 is applied to a gate generator 98 which also drives logic 94. Gate generator 98 provides a split gate pulse to logic 94.

The time difference between the occurrence of a pulse from comparator 91 and a pulse from comparator 93 is representative of the deviation of the aircraft from the intended course, while the order of occurrence of the pulses is representative of the sense of course deviation. A signal proportional to the time difference of the two pulses is generated by flip flops 95 and 96, which are gated by the respective pulses such that each produces a pulse having a width proportional to the deviation. The variable width pulses are applied to respective integrators 101 and 102 to provide a DC output signal of a magnitude proportional to the deviation angle, this voltage being operative to suitably drive cross-pointer indicator 88. Flip flop 97 is set by the frame gate pulse from angle clock 32 and is reset by the indicated comparator output pulse from comparator 91, and is operative to enable one of the flip flops 95 and 96, depending upon the order of occurrence of the desired pulse and the indicated pulse. Sense determination between the present course and the intended course is therefore provided. As mentioned hereinabove, determination of elevation position is accomplished in a similar manner by processing angle data derived from the stepped elevation beams received from the transmitting ground station.

It will be appreciated that the angle clock 32 and azimuth register 90 in essence function as a digital servo-loop. The azimuth register 90 stores the indicated azimuth angle while the angle clock provides a sequence of all possible azimuth angles from zero to 360°. The angle clock sequences through a complete set of possible values within one frame, and at the time the angle clock generates a particular number equal to the number in the azimuth register, a pulse is produced by comparator 91 which drives the associated gating circuitry. The time relative to the frame sync can be adjusted by changing the number in the azimuth register, and the output of split gate logic 94 determines whether the number in register 90 should be increased or decreased. The indicated value in register 90 is effectively controlled by the output of logic 94 until a zero output error condition occurs. The present system operates typically at a rate of 100 frames per second and thus a high sampling rate is achieved.

Split gate logic circuitry is employed in a time-error detector for purposes of synchronization, as in FIG. 7, and for angle time measurement, as in FIG. 8. The input to the split gate logic circuitry is a video signal and a split gate signal, and the logic provides three digital outputs, one output indicating signal acquisition in either or both halves of the gate, and the other two outputs indicating the relative energy in each half of the gate. The output signals can be the integrated result of one or many frames and appear in binary logic level form. Synchronization and frequency adjustment is completely digital in operation and allows for extremely fine control.

Figure 9:
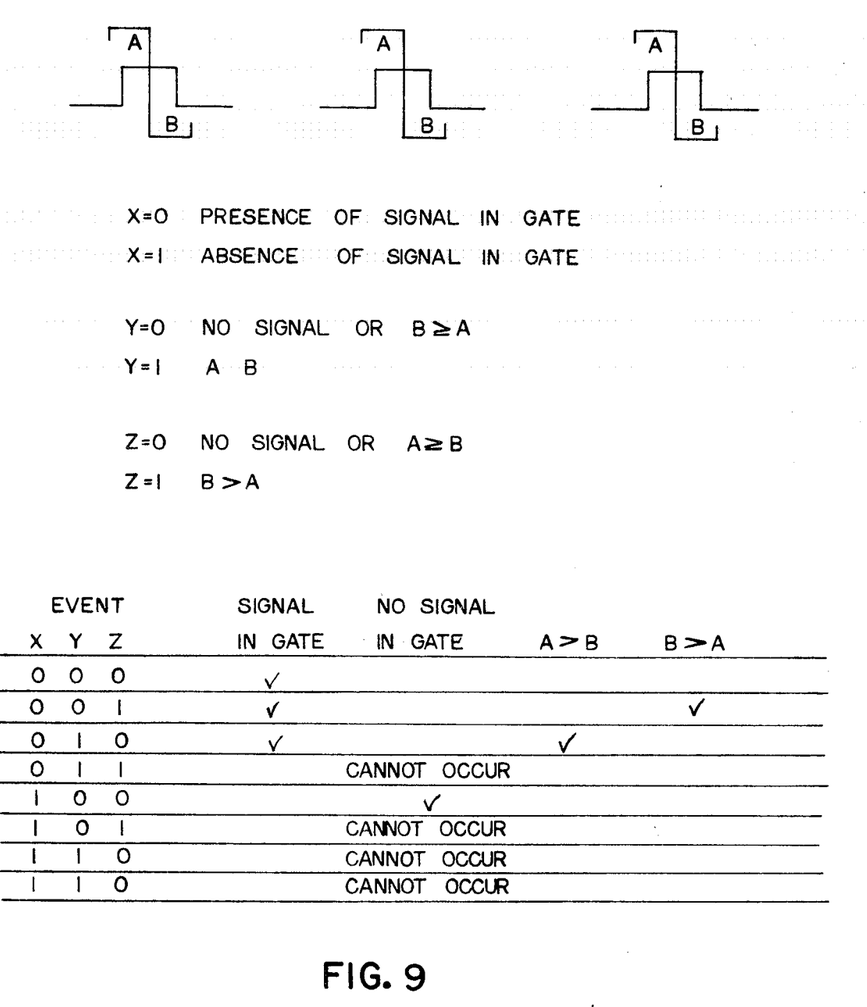
FIG. 9 is a truth table useful in explaining the operation of the split-gate logic circuitry.

Before describing the split gate circuitry itself, it will be useful to consider the logical functioning of this circuitry, as set forth in the truth table of FIG. 9. Referring to the truth table, the output X indicates the presence or absence of a signal in the gate. When X equals one, no signal is present, while a signal is present in the gate when X equals zero. X also equals one when the signal is undetectable. The outputs Y and Z indicate time errors. Y equals one asserts that more energy exists in half A of the split gate than half B. Y equals zero asserts that no signal is present or energy in half B is equal to or greater than energy in half A. Z equals one asserts that more energy exists in half B than in half A, while Z equals zero when no signal is present or when energy in half Z is equal to or greater than half B. The output signals from the split gate logic are used to synchronize the system. When X, Y and Z all equal zero, the system is synchronized. When X equals zero, Y equals zero, and Z equals one, a forward error exists. When X equals one, Y equals zero, and Z equals zero, the system is directed into a search mode.

Figure 10A:
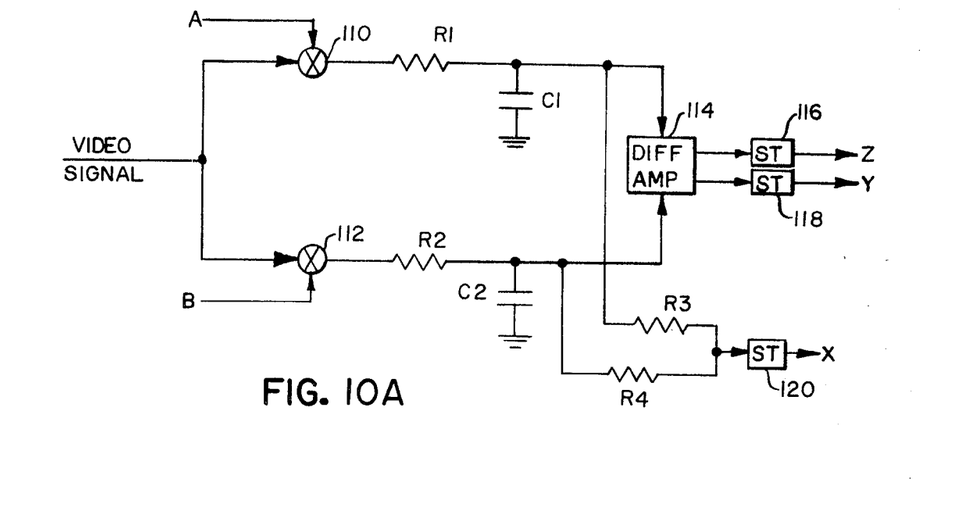
FIGS. 10A and 10B are schematic diagrams of the split-gate logic circuitry employed in the invention.

The split gate logic circuitry is illustrated schematically in FIG. 10A and includes gating circuitry operative to produce the logical outputs X, Y and Z in response to the input video signal and the split gate signal. The particular circuit operation varies with its use in the system since a time constant is chosen to provide integration over one frame or several frames, as the system requires. For the purpose of course sync logic, the time constant is chosen to provide integration over many frames, while the fine sync time constants are chosen for one or two frame integration. The logic circuitry of FIG. 10A includes a pair of mixers 110 and 112, to one input of which is applied a respective gate signal A and B. Signal A is the positive half of the split gate, while signal B is the negative half of the split gate. The output of each mixer 110 and 112 is applied via a respective integration circuit composed of a series resistor and a shunt capacitor, $R_1 C_1$ and $R_2 C_2$, to a negative input of a differential amplifier 114. The two outputs of amplifier 114 are applied to respective Schmitt triggers 116 and 117, the outputs of which are the Z and Y signals respectively. The X output signal is derived by summing, by means of resistors $R_3$ and $R_4$, the integrated signals from mixers 110 and 112, the summed signal being applied to a Schmitt trigger 120.

In operation, the input video signal is gated by signal A and is integrated during the period of the gate, the voltage across capacitor $C_1$ at the end of the gate period being the integrated signal. Similarly, the voltage across capacitor $C_2$ is the integrated version of the video signal sampled during gate B. These integrated signals are employed to compare the energy of the video signal in each half of the split gate. The integrated signals are applied to differential amplifier 114 which is operative to energize Schmitt triggers 116 and 118, or either of them, depending upon the relative magnitudes of the integrated signals. The circuit functions according to the truth table of FIG. 9; thus, Schmitt trigger 116 is energized when the magnitude of the video signal during gate A is greater than during gate B. The X output appears whenever there is no signal being gated. The time constants of the integrators are of a value to permit integration over one frame or over two or more frames as the system requires.

Figure 10B:
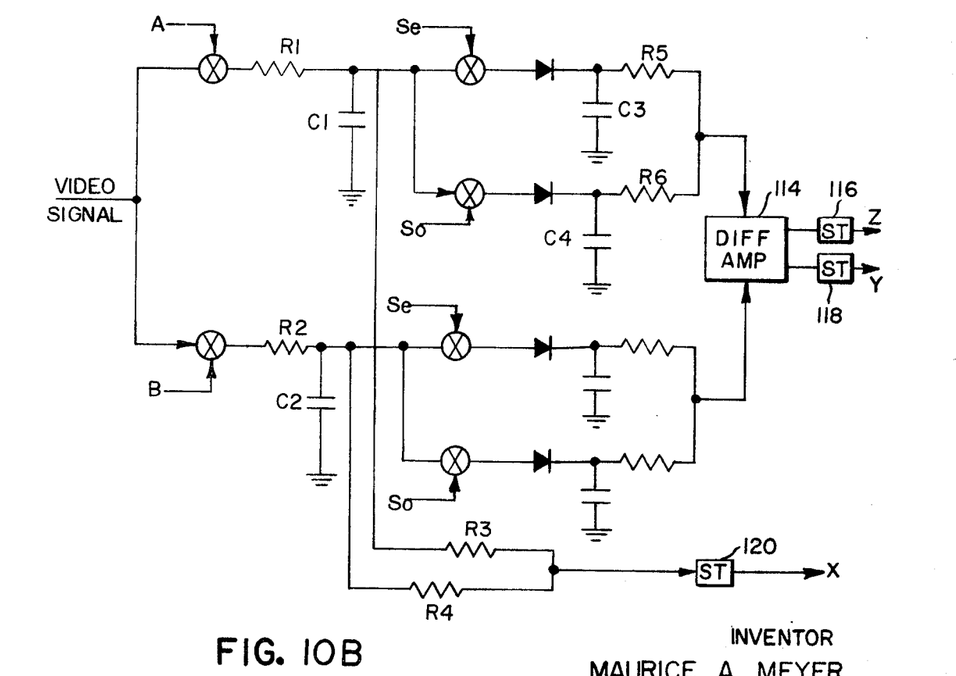

For the purpose of storing frame interlaced average information, the circuit of FIG. 10B is employed. This circuit is similar to that of FIG. 10A, with the addition of further gating means for averaging the signal over odd and even frames. The integrated signal stored by capacitor $C_1$ is sampled either by a control signal $S_e$ or $S_o$, depending upon the presence of an odd or even frame of information. The voltage on capacitor $C_1$ is transferred to a capacitor $C_3$ or $C_4$, the average value of this voltage being held for two frames and summed by resistors $R_5$ and $R_6$, for application to one input of differential amplifier 114. In similar manner, an averaged signal is derived for the other input of the differential amplifier. The logical outputs X, Y and Z are again as in the truth table of FIG. 9, but, in this instance, the logical values represent averaged information of successive odd and even frames.

From the foregoing, it should be evident that the invention provides precise and continuous course position determination from time sequential spatially stepped antenna beams. Systems embodying the invention can be implemented in a variety of ways to suit particular operating requirements, and it is not intended to limit the invention by what has been particularly shown and described.

What is claimed is:

1. In combination:
    means disposed at a reference point for radiating an antenna pattern which is substantially omnidirectional about at least one axis in a predetermined time sequence;
    means disposed at said reference point for providing a plurality of time sequential spatially stepped antenna beams in a predetermined time sequence related to the time sequence of said omnidirectional pattern, said antenna beams defining a directional pattern relative to said reference point;
    signal processing means located aboard a craft and operative in response to said omnidirectional antenna pattern and said time sequential spatially stepped antenna beams to derive information functionally related to said reference point, said signal processing means including:
    means for receiving said omnidirectional antenna pattern and said stepped antenna beams; and
    means for deriving a signal varying as a function of the time difference of characteristics of the signals received from said omnidirectional antenna pattern and said stepped antenna beams.

2. The combination according to claim 1 wherein said signal processing means includes:
   means operative in response to said omnidirectional antenna pattern to provide a time reference; and
   means operative in response to said time sequential spatially stepped antenna beams to derive a weighted time center.

3. The combination according to claim 1 wherein said signal processing means includes:
   means operative in response to said received omnidirectional antenna pattern to provide a time reference;
   means operative in response to said received stepped antenna beams to compare the relative amplitudes thereof and to provide a weighted time center of said received beams; and
   means for determining the time difference between the occurrence of said time reference and said weighted time center.

4. The combination according to claim 1 wherein said signal processing means includes:
   circuitry for providing a first signal at a time representative of an intended craft direction relative to said reference point;
   circuitry for providing a second signal at a time representative of the actual craft direction relative to said reference point; and
   means for determining the time difference between the occurrence of said first and second signals, said time difference varying as a function of the direction of said craft from said reference point and the order of occurrence of said first and second signals being representative of the sense of the deviation from a predetermined direction.

5. An instrument landing system for determining craft direction from time sequential spatially stepped antenna beams, said system comprising:
   means disposed at a reference point for providing an omnidirectional antenna pattern in a predetermined time sequence;
   means disposed at said reference point for providing a plurality of time sequential spatially stepped antenna beams in a predetermined time sequence related to the time sequence of said omnidirectional pattern, said antenna beams defining a directional pattern relative to said reference point;
   signal processing means located aboard a craft and operative in response to said omnidirectional antenna pattern and said time sequential spatially stepped antenna beams to continuously determine craft direction relative to said reference point, said signal processing means including:
   means for receiving said omnidirectional antenna pattern and said stepped antenna beams; and
   means for deriving signals from said received antenna pattern and antenna beams representative of the direction of said craft relative to said reference point.

6. The system according to claim 5 wherein said means for providing stepped antenna beams includes means for providing a plurality of time sequential spatially stepped antenna beams in both the azimuth plane and the elevation plane.

7. The system according to claim 5 wherein said signal processing means includes:
   means operative in response to said received omnidirectional antenna pattern to provide a time reference;
   means operative in response to said received time sequential spatially stepped antenna beams to derive a weighted time center thereof; and
   means for determining the time difference between the occurrence of said time reference and said weighted time center, said difference being representative of the position of said craft relative to said reference point.

8. The system according to claim 5 wherein said signal processing means includes:
   means operative in response to said received omnidirectional antenna pattern to provide a time reference;
   means operative in response to said received stepped antenna beams to compare the relative amplitudes thereof and to provide a weighted time center of said received beams; and
   means for determining the time difference between the occurrence of said time reference and said weighted time center, said time difference being representative of the direction of said craft relative to said reference point.

9. The system according to claim 5 wherein said signal processing means includes:
   circuitry for providing a first signal at a time representative of an intended craft direction relative to said reference point;
   circuitry for providing a second signal at a time representative of the actual craft direction relative to said reference point; and
   means for determining the time difference between the occurrence of said first and second signals, said time difference being representative of the deviation of the craft from said intended direction, and the order of occurrence of said first and second signals being representative of the sense of the deviation from said intended direction.

10. The system according to claim 6 wherein said signal processing means includes:
    means operative in response to said received omnidirectional antenna pattern to provide a time reference;
    means operative in response to said received time sequential spatially stepped antenna beams in both the azimuth plane and the elevation plane to derive a weighted time center thereof in respective planes; and
    means for determining the time difference between the occurrence of said time reference and each weighted time center, said time differences being representative of the direction of said craft in the azimuth and elevation planes relative to said reference point.

11. The system according to claim 6 wherein said signal processing means includes for each of said azimuth and elevation planes:
    a selector switch for manual selection of a digital number representative of an intended course angle;
    an angle clock for providing a sequence of digital numbers representative of possible course angles;
    circuitry for providing a first signal when the digital number from said selector switch and the digital number from said angle clock are equal;

circuitry for providing a digital number representative of said craft direction;

circuitry for providing a second signal when the digital number from said angle clock and the digital number of said craft direction are equal;

gating means for providing pulses of a width proportional to the time difference between the occurrence of said first and second signals; and integrating means for providing an output signal of a magnitude proportional to the width of the pulses from said gating means, and representative of the deviation of the craft from said intended direction.

12. The system according to claim 11 including gating means for indicating the order of occurrence of said first and second signals thereby to indicate the sense of deviation from said intended direction.

13. The system according to claim 12 including means for displaying the magnitude and sense of deviation from said intended direction.

14. In combination:

means disposed on a movable craft for detecting data signals modulated on energy patterns radiated from a predetermined locus, with a plurality of said detected energy patterns being substantially directionally radiated in a plurality of respectively different directions, with portions of adjacent of said directionally radiated energy patterns substantially mutually overlapping and with at least an additional one of said detected energy patterns overlapping at least the major portions of said directionally radiated energy patterns; and means on said movable craft fed by said detecting means for cyclically processing said detected data signals to produce a signal which varies as a function of the direction of said craft with respect to said locus.

15. The combination according to claim 14 wherein each of said data signals comprises at least one pulse of a predetermined cyclical time sequence.

16. The combination according to claim 14 wherein the output of said processing means controls an indicator whose output varies as a function of the direction of said craft with respect to said locus.

* * * * *